United States Patent
Ho et al.

(10) Patent No.: US 8,439,312 B2
(45) Date of Patent: *May 14, 2013

(54) SYSTEM AND METHODS FOR SIMULTANEOUS MOMENTUM DUMPING AND ORBIT CONTROL

(75) Inventors: Yiu-Hung M. Ho, Palos Verdes Estates, CA (US); Jeffrey A. Kurland, Rancho Palos Verdes, CA (US); David S. Uetrecht, Palos Verdes Estates, CA (US)

(73) Assignee: The Boeing Company, Chicago, IL (US)

( * ) Notice: Subject to any disclaimer, the term of this patent is extended or adjusted under 35 U.S.C. 154(b) by 874 days.

This patent is subject to a terminal disclaimer.

(21) Appl. No.: 12/141,832

(22) Filed: Jun. 18, 2008

(65) Prior Publication Data
US 2009/0078829 A1    Mar. 26, 2009

Related U.S. Application Data

(63) Continuation-in-part of application No. 11/778,909, filed on Jul. 17, 2007, now Pat. No. 7,918,420.

(51) Int. Cl.
*B64G 1/26* (2006.01)
*B64G 1/10* (2006.01)

(52) U.S. Cl.
USPC .................................... 244/169; 244/158.8

(58) Field of Classification Search .......... 244/169, 244/158.8, 170, 164, 171, 171.1, 171.2; 701/13
See application file for complete search history.

(56) References Cited

U.S. PATENT DOCUMENTS

| | | | |
|---|---|---|---|
| 4,767,084 A | 8/1988 | Chan et al. | |
| 5,284,309 A * | 2/1994 | Salvatore et al. | 244/135 C |
| 5,443,231 A | 8/1995 | Anzel | |
| 5,806,804 A * | 9/1998 | Goodzeit et al. | 244/169 |
| 5,810,295 A | 9/1998 | Anzel | |
| 5,984,236 A | 11/1999 | Keitel et al. | |
| 6,015,116 A | 1/2000 | Anzel et al. | |
| 6,042,058 A | 3/2000 | Anzel | |
| 6,340,138 B1 * | 1/2002 | Barsky et al. | 244/165 |
| 6,435,457 B1 | 8/2002 | Anzel | |
| 6,439,507 B1 | 8/2002 | Reckdahl et al. | |
| 6,921,049 B2 * | 7/2005 | Fowell | 244/164 |
| 7,918,420 B2 | 4/2011 | Ho | |
| 2011/0144835 A1 | 6/2011 | Ho | |

OTHER PUBLICATIONS

USPTO Office action for U.S. Appl. No. 11/778,909 dated May 26, 2010.

(Continued)

*Primary Examiner* — Tien Dinh
(74) *Attorney, Agent, or Firm* — Yee & Associates, P.C.

(57) ABSTRACT

The present system and methods enable simultaneous momentum dumping and orbit control of a spacecraft, such as a geostationary satellite. Control equations according to the present system and methods generate accurate station-keeping commands quickly and efficiently, reducing the number of maneuvers needed to maintain station and allowing station-keeping maneuvers to be performed with a single burn. Additional benefits include increased efficiency in propellant usage, and extension of the satellite's lifespan. The present system and methods also enable tighter orbit control, reduction in transients and number of station-keeping thrusters aboard the satellite. The present methods also eliminate the need for the thrusters to point through the center of mass of the satellite, which in turn reduces the need for dedicated station-keeping thrusters. The present methods also facilitate completely autonomous orbit control and angular momentum control using.

22 Claims, 4 Drawing Sheets

OTHER PUBLICATIONS

USPTO non-final office action dated Jan. 6, 2012 regarding U.S. Appl. No. 13/033,170, 13 Pages.
USPTO notice of allowance dated May 23, 2012 regarding U.S. Appl. No. 13/033,170, 5 Pages.
Preliminary amendment dated Feb. 23, 2011 regarding U.S. Appl. No. 13/033,170, 11 Pages.
Second preliminary amendment dated Apr. 14, 2011 regarding U.S. Appl. No. 13/033,170, 13 Pages.
Response to office action dated Mar. 13, 2012 regarding U.S. Appl. No. 13/033,170, 24 Pages.
Response to office action dated Aug. 10, 2010 regarding U.S. Appl. No. 11/778,909, 22 Pages.
USPTO Restriction requirement dated Dec. 24, 2009 regarding U.S. Appl. No. 11/778,909, 6 Pages.
Response to restriction requirement dated Nov. 23, 2010 regarding U.S. Appl. No. 11/778,909, 13 Pages.
Response to restriction requirement dated Feb. 22, 2010 regarding U.S. Appl. No. 11/778,909, 25 Pages.
USPTO notice of allowance dated Dec. 10, 2010 regarding U.S. Appl. No. 11/778,909, 5 Pages.

* cited by examiner

SYSTEM AND METHODS FOR SIMULTANEOUS MOMENTUM DUMPING AND ORBIT CONTROL

CROSS-REFERENCE TO RELATED APPLICATION

This application is a continuation-in-part of application Ser. No. 11/778,909, filed on Jul. 17, 2007, now U.S. Pat. No. 7,918,420, issued on Apr. 5, 2011, the entire contents of which are hereby incorporated by reference.

BACKGROUND

1. Technical Field

The present disclosure relates to station-keeping for synchronous satellites.

2. Description of Related Art

With reference to FIG. 1, a synchronous satellite 10 orbits the Earth 12 at a rate that matches the Earth's rate of revolution, so that the satellite 10 remains above a fixed point on the Earth 12. FIG. 1 illustrates the satellite 10 at two different points A, B along its orbit path 14. Synchronous satellites are also referred to as geostationary satellites, because they operate within a stationary orbit. Synchronous satellites are used for many applications including weather prediction and communications.

Various forces act on synchronous satellites to perturb their stationary orbits. Examples include the gravitational effects of the sun and the moon, the elliptical shape of the Earth and solar radiation pressure. To counter these forces, synchronous satellites are equipped with propulsion systems that are fired at intervals to maintain station in a desired orbit. For example, the satellite 10 illustrated in FIG. 1 includes a plurality of thrusters 16.

The process of maintaining station, also known as "station-keeping," requires control of the drift, inclination and eccentricity of the satellite. With reference to FIG. 1, drift is the east-west position of the satellite 10 relative to a sub-satellite point on the Earth 12. Inclination is the north-south position of the satellite 10 relative to the Earth's equator. Eccentricity is the measure of the non-circularity of the satellite orbit 14, or the measure of the variation in the distance between the satellite 10 and the Earth 12 as the satellite 10 orbits the Earth 12. Typically, satellite positioning, and in some instances satellite orientation, is controlled from Earth. A control center monitors the satellite's trajectory and issues periodic commands to the satellite to correct orbit perturbations. Typically, orbit control is performed once every two weeks, and momentum dumping is performed every day or every other day.

Current satellites are either spin-stabilized or three-axis stabilized satellites. Spin-stabilized satellites use the gyroscopic effect of the satellite spinning to help maintain the satellite orbit. For certain applications, however, the size of the satellite militates in favor of a three-axis stabilization scheme. Some current three-axis stabilized satellites use separate sets of thrusters to control north-south and east-west motions. The thrusters may burn a chemical propellant or produce an ion discharge, for example, to produce thrust. Alternatively, the thrusters may comprise any apparatus configured to produce a velocity change in the satellite. The north-south thrusters produce the required north-south change in satellite velocity, or $\Delta V$, to control orbit inclination. The east-west thrusters produce the required combined east-west $\Delta V$ to control drift and eccentricity. As the cost of satellite propulsion systems is directly related to the number of thrusters required for station keeping, it is advantageous to reduce the number of thrusters required for satellite propulsion and station keeping. Further, propulsion systems have limited life spans because of the limited supply of fuel onboard the satellite. Thus, it is also advantageous to reduce fuel consumption by onboard thrusters so as to extend the usable life of the satellite.

SUMMARY

The embodiments of the present system and methods for simultaneous momentum dumping and orbit control have several features, no single one of which is solely responsible for their desirable attributes. Without limiting the scope of this system and these methods as expressed by the claims that follow, their more prominent features will now be discussed briefly. After considering this discussion, and particularly after reading the section entitled "Detailed Description", one will understand how the features of the present embodiments provide advantages, which include a reduction in the number of maneuvers needed to maintain station, increased efficiency in propellant usage, reduction in transients, tighter orbit control, which has the added benefit of reducing the antenna pointing budget, a reduction in the number of station-keeping thrusters needed aboard the satellite, elimination of any need for the thrusters to point through the center of mass of the satellite, thus reducing the need for dedicated station-keeping thrusters, and the potential to enable completely autonomous orbit and angular momentum control.

In one embodiment of the present methods of simultaneous orbit control and momentum dumping in a spacecraft, the spacecraft includes a plurality of north/south thrusters having negligible thrust components in the x-z plane. The method comprises the steps of generating a set of firing commands for the north/south thrusters from solutions to inclination control and roll/yaw momentum dumping equations, and firing the north/south thrusters according to the firing commands.

In another embodiment of the present methods of simultaneous orbit control and momentum dumping in a spacecraft, the spacecraft includes a plurality of east west thrusters having negligible thrust components out of the x-z plane. The method comprises the steps of generating a set of firing commands for the east/west thrusters from solutions to drift and eccentricity control and pitch momentum dumping equations, and firing the east/west thrusters according to the firing commands.

One embodiment of the present system for simultaneous orbit control and momentum dumping of a spacecraft comprises a spacecraft including a plurality of north/south thrusters having negligible thrust components in the x-z plane. The system further comprises means for generating a set of firing commands for the north/south thrusters from solutions to inclination control and roll/yaw momentum dumping equations.

Another embodiment of the present system for simultaneous orbit control and momentum dumping of a spacecraft comprises a spacecraft configured to orbit Earth in a geostationary orbit. The spacecraft is further configured to autonomously control a position of the spacecraft relative to a fixed point on Earth. The spacecraft comprises a spacecraft body, and a plurality of north/south thrusters associated with the spacecraft body. The north south thrusters have negligible thrust components in the x-z plane. The spacecraft generates a set of firing commands for the north/south thrusters from solutions to inclination control and roll/yaw momentum dumping equations, and the spacecraft fires the thrusters according to the firing commands.

The features, functions, and advantages of the present embodiments can be achieved independently in various embodiments or may be combined in yet other embodiments.

BRIEF DESCRIPTION OF THE DRAWINGS

The embodiments of the present system and methods for simultaneous momentum dumping and orbit control will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Figure 1:
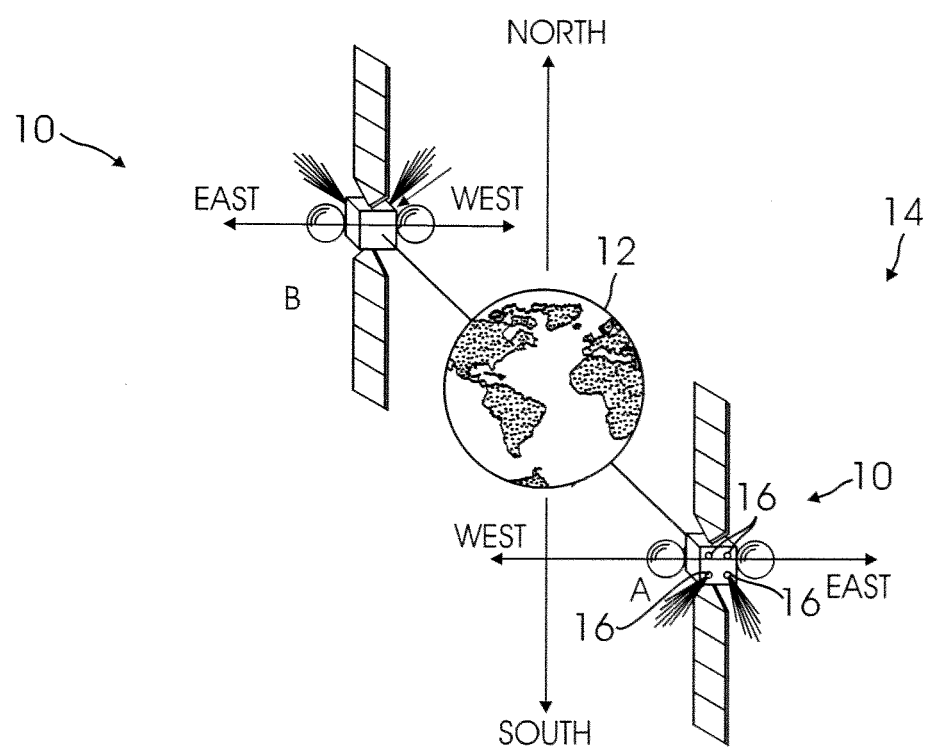
FIG. 1 is a front perspective view of a geostationary satellite orbiting the Earth.

In describing the present embodiments, the following symbols will be used:
Eccentricity(e) Vector:
$\Sigma = \Omega + \tan^{-1}(\tan(\omega)\cos(i))$
$h_1 = e \sin(\Sigma)$
$k_1 = e \cos(\Sigma)$
Inclination(i) Vector:
$h_2 = \sin(i) \sin \Omega$
$k_2 = \sin(i) \cos \Omega$
$\Omega$ = right ascension of ascending node
$\omega$ = argument of perigee
I=i=inclination of the orbit $$\text{mean drift rate} = \left[ \frac{2\pi}{\text{Period}_{Nominal}} \sqrt{\frac{a^3}{\mu}} - 1 \right]$$

$\alpha$ = semi-major axis
$\text{Period}_{Nominal}$ = nominal orbital period of the desired orbit
$V_{synchronous}$ = orbital velocity at geosynchronous orbit
$R_{synchronous}$ = distance from center of the Earth at geosynchronous orbit
$\Delta V_i$ = magnitude of the delta velocity for $i^{th}$ maneuver
$t_i$ = direction cosine of $\Delta V_i$ along orbit tangential direction
$n_i$ = direction cosine of $\Delta V_i$ along orbit normal direction
$r_i$ = direction cosine of $\Delta V_i$ along orbit radial direction
$\lambda_i$ = applied delta velocity right ascension
$\Delta V_{lon}$ = minimum delta velocity required for change of argument of latitude (*mean longitude)
$\Delta V_{drift}$ = minimum delta velocity required to control mean semi-major axis (*longitudinal drift)
$\Delta V_{K_1}$ = minimum delta velocity required to control mean $K_1$
$\Delta V_{H_1}$ = minimum delta velocity required to control mean $H_1$
$\Delta V_{K_2}$ = minimum delta velocity required to control mean $K_2$
$\Delta V_{H_2}$ = minimum delta velocity required to control mean $H_2$
*For geosynchronous orbit To control orbit, the size(s) ($\Delta V$) and location(s) ($\lambda$) of the maneuver(s) that can correct the orbit must be found. The basic control equations for drift and eccentricity control are:

$$\sum_{i=1,2} \Delta V_i t_i = \Delta V_{drift}$$

$$\sum_{i=1,2} \Delta V_i (2t_i \cos\lambda_i + r_i \sin\lambda_i) = \Delta V_{K_1}$$

$$\sum_{i=1,2} \Delta V_i (2t_i \sin\lambda_i - r_i \cos\lambda_i) = \Delta V_{H_1}$$

And the basic control equations for inclination control are:

$\Delta V_3 n_3 \cos \lambda_3 = \Delta V_{K_2}$ $\Delta V_3 n_3 \sin \lambda_3 = \Delta V_{H_2}$ Under some circumstances, a set of three burns may be used to control the longitudinal drift rate, eccentricity [$K_1$ $H_1$], and inclination [$K_2$ $H_2$] for a satellite in near geo-stationary orbit. From the equations and symbols above, then:

$$\sum_{i=1,3} \Delta V_i r_i = \Delta V_{lon}$$

$$\sum_{i=1,3} \Delta V_i t_i = \Delta V_{drift}$$

$$\sum_{i=1,3} \Delta V_i (2t_i \cos\lambda_i + r_i \sin\lambda_i) = \Delta V_{K_1}$$

$$\sum_{i=1,3} \Delta V_i (2t_i \sin\lambda_i - r_i \cos\lambda_i) = \Delta V_{H_1}$$

$$\sum_{i=1,3} \Delta V_i n_i \cos\lambda_i = \Delta V_{K_2}$$

$$\sum_{i=1,3} \Delta V_i n_i \sin\lambda_i = \Delta V_{H_2}$$

Under some circumstances, however, the longitude equation above may not be used. For example, after orbit initialization the satellite is at the nominal longitude location. Then only the longitudinal drift may need to be corrected in order to keep the longitude error to within a desired range, such as, for example ±0.05°. Therefore, the remaining five equations form the basis for the maneuver calculation. In some situations these equations cannot be solved analytically. However, careful choices regarding, for example, thruster locations and orientations and satellite configurations can simplify their solutions.

Propellant consumption is sometimes the primary concern for chemical propulsion systems. Therefore, station-keeping thrusters may be configured specifically either for north/south (inclination control) or east/west (drift and eccentricity control) maneuvers with minimal unwanted components. Under these conditions the set of equations above becomes:

$$\sum_{i=1,2} \Delta V_i t_i = \Delta V_{drift}$$

$$\sum_{i=1,2} \Delta V_i (2t_i \cos\lambda_i + r_i \sin\lambda_i) = \Delta V_{K_1}$$

$$\sum_{i=1,2} \Delta V_i (2t_i \sin\lambda_i - r_i \cos\lambda_i) = \Delta V_{H_1}$$

$$\Delta V_3 n_3 \cos\lambda_3 = \Delta V_{K_2}$$

$$\Delta V_3 n_3 \sin\lambda_3 = \Delta V_{H_2}$$

with the first three equations above controlling drift and eccentricity and the last two equations controlling inclination.

For maneuver planning, the size(s) ($\Delta V$) and location(s) ($\lambda$) of the burn(s) that can correct the orbit according to the selected control strategy must be found. For a given $\Delta V_{drift}$ and $[\Delta V_{K1}\ \Delta V_{H1}]$, one can solve for the two sets of $\Delta V$'s and $\lambda$'s analytically by reformulating the equations for drift and eccentricity control:

$$\sum_{i=1,2} \Delta V_i t_i = \Delta V_{drift} \Delta V_1 (2t_1 \cos\lambda_1 + r_1 \sin\lambda_1) +$$
$$\Delta V_2 (2t_2 \cos(\lambda_1 - \Delta\lambda) + r_2 \sin(\lambda_1 - \Delta\lambda))$$
$$= \Delta V_{K_1} \Delta V_1 (2t_1 \sin\lambda_1 - r_1 \cos\lambda_1) +$$
$$\Delta V_2 (2t_2 \sin(\lambda_1 - \Delta\lambda) - r_2 \cos(\lambda_1 - \Delta\lambda))$$
$$= \Delta V_{H_1} - 2\Delta V_1 r_1 \Delta V_2 r_2 \sin\Delta\lambda - 4\Delta V_1 t_1 \Delta V_2 r_2 \cos\Delta\lambda -$$
$$8\Delta V_1 t_1 \Delta V_2 t_2 \sin\Delta\lambda + 4\Delta V_1 r_1 \Delta V_2 t_2 \cos\Delta\lambda$$
$$= 0$$

where $\lambda_2 = \lambda_1 - \Delta\lambda$

In the equations above there are four possible solutions for $\Delta V_1$, $\Delta V_2$, $\lambda_1$ and $\Delta\lambda$:

$$\Delta V_1 = \begin{Bmatrix} \dfrac{\sqrt{B}\left(16\dfrac{\Delta V_{drift} t_1^2 t_2^2}{\sqrt{AB}} + 4\dfrac{\Delta V_{drift} t_1^2 r_2^2}{\sqrt{AB}} + \dfrac{\Delta V_{drift} r_1^2 r_2^2}{\sqrt{AB}} + 4\dfrac{\Delta V_{drift} t_2^2 r_1^2}{\sqrt{AB}} - t_2\right)}{(4t_2^2 + r_1^2)\left(4\dfrac{t_2^2 t_1}{\sqrt{A}} + \dfrac{t_1 r_2^2}{\sqrt{A}} - t_2\right)} \\ \dfrac{\sqrt{B}\left(16\dfrac{\Delta V_{drift} t_1^2 t_2^2}{\sqrt{AB}} + 4\dfrac{\Delta V_{drift} t_1^2 r_2^2}{\sqrt{AB}} + \dfrac{\Delta V_{drift} r_1^2 r_2^2}{\sqrt{AB}} + 4\dfrac{\Delta V_{drift} t_2^2 r_1^2}{\sqrt{AB}} + t_2\right)}{(4t_2^2 + r_1^2)\left(4\dfrac{t_2^2 t_1}{\sqrt{A}} + \dfrac{t_1 r_2^2}{\sqrt{A}} - t_2\right)} \\ \dfrac{\sqrt{B}\left(16\dfrac{\Delta V_{drift} t_1^2 t_2^2}{\sqrt{AB}} + 4\dfrac{\Delta V_{drift} t_1^2 r_2^2}{\sqrt{AB}} + \dfrac{\Delta V_{drift} r_1^2 r_2^2}{\sqrt{AB}} + 4\dfrac{\Delta V_{drift} t_2^2 r_1^2}{\sqrt{AB}} + t_2\right)}{(4t_2^2 + r_1^2)\left(4\dfrac{t_2^2 t_1}{\sqrt{A}} + \dfrac{t_1 r_2^2}{\sqrt{A}} + t_2\right)} \\ \dfrac{\sqrt{B}\left(16\dfrac{\Delta V_{drift} t_1^2 t_2^2}{\sqrt{AB}} + 4\dfrac{\Delta V_{drift} t_1^2 r_2^2}{\sqrt{AB}} + \dfrac{\Delta V_{drift} r_1^2 r_2^2}{\sqrt{AB}} + 4\dfrac{\Delta V_{drift} t_2^2 r_1^2}{\sqrt{AB}} - t_2\right)}{(4t_2^2 + r_1^2)\left(4\dfrac{t_2^2 t_1}{\sqrt{A}} + \dfrac{t_1 r_2^2}{\sqrt{A}} + t_2\right)} \end{Bmatrix}$$

$$A = 4t_1^2 r_2^2 + 4r_1^2 t_2^2 + r_1^2 r_2^2 + 16 t_1^2 t_2^2$$
$$B = 4t_1^2 \Delta V_{H_1}^2 + 4t_1^2 \Delta V_{K_1}^2 + r_1^2 \Delta V_{K_1}^2 + r_1^2 \Delta V_{H_1}^2$$

$$\Delta V_2 = \begin{Bmatrix} \dfrac{-\Delta V_{drift}\left(4\Delta V_{drift} t_1^2 + r_1^2 - t_1\sqrt{B}\right)}{(4t_2^2 + r_1^2)\left(4\dfrac{t_2^2 t_1}{\sqrt{A}} + \dfrac{t_1 r_2^2}{\sqrt{A}} - t_2\right)} \\ \dfrac{-\Delta V_{drift}\left(4\Delta V_{drift} t_1^2 + r_1^2 + t_1\sqrt{B}\right)}{(4t_2^2 + r_1^2)\left(4\dfrac{t_2^2 t_1}{\sqrt{A}} + \dfrac{t_1 r_2^2}{\sqrt{A}} - t_2\right)} \\ \dfrac{\Delta V_{drift}\left(4\Delta V_{drift} t_1^2 + r_1^2 - t_1\sqrt{B}\right)}{(4t_2^2 + r_1^2)\left(4\dfrac{t_2^2 t_1}{\sqrt{A}} + \dfrac{t_1 r_2^2}{\sqrt{A}} + t_2\right)} \\ \dfrac{\Delta V_{drift}\left(4\Delta V_{drift} t_1^2 + r_1^2 + t_1\sqrt{B}\right)}{(4t_2^2 + r_1^2)\left(4\dfrac{t_2^2 t_1}{\sqrt{A}} + \dfrac{t_1 r_2^2}{\sqrt{A}} + t_2\right)} \end{Bmatrix}$$

$$A = 4t_1^2 r_2^2 + 4r_1^2 t_2^2 + r_1^2 r_2^2 + 16 t_1^2 t_2^2$$
$$B = 4t_1^2 \Delta V_{H_1}^2 + 4t_1^2 \Delta V_{K_1}^2 + r_1^2 \Delta V_{K_1}^2 + r_1^2 \Delta V_{H_1}^2$$

$$\lambda_1 = \begin{Bmatrix} \mathrm{atan2}\left(\dfrac{r_1 \Delta V_{K_1} + 2t_1 \Delta V_{H_1}}{\sqrt{B}}, \dfrac{2t_1 \Delta V_{K_1} - r_1 \Delta V_{H_1}}{\sqrt{B}}\right) \\ \mathrm{atan2}\left(-\dfrac{r_1 \Delta V_{K_1} + 2t_1 \Delta V_{H_1}}{\sqrt{B}}, -\dfrac{2t_1 \Delta V_{K_1} - r_1 \Delta V_{H_1}}{\sqrt{B}}\right) \\ \mathrm{atan2}\left(\dfrac{r_1 \Delta V_{K_1} + 2t_1 \Delta V_{H_1}}{\sqrt{B}}, \dfrac{2t_1 \Delta V_{K_1} - r_1 \Delta V_{H_1}}{\sqrt{B}}\right) \\ \mathrm{atan2}\left(-\dfrac{r_1 \Delta V_{K_1} + 2t_1 \Delta V_{H_1}}{\sqrt{B}}, -\dfrac{2t_1 \Delta V_{K_1} - r_1 \Delta V_{H_1}}{\sqrt{B}}\right) \end{Bmatrix}$$

$$\Delta\lambda = \begin{Bmatrix} \mathrm{atan2}\left(\dfrac{2(t_2 r_1 - t_1 r_2)}{\sqrt{A}}, \dfrac{r_1 r_2 + 4 t_1 t_2}{\sqrt{A}}\right) \\ \mathrm{atan2}\left(\dfrac{2(t_2 r_1 - t_1 r_2)}{\sqrt{A}}, \dfrac{r_1 r_2 + 4 t_1 t_2}{\sqrt{A}}\right) \\ \mathrm{atan2}\left(\dfrac{2(t_2 r_1 - t_1 r_2)}{\sqrt{A}}, -\dfrac{r_1 r_2 + 4 t_1 t_2}{\sqrt{A}}\right) \\ \mathrm{atan2}\left(-\dfrac{2(t_2 r_1 - t_1 r_2)}{\sqrt{A}}, -\dfrac{r_1 r_2 + 4 t_1 t_2}{\sqrt{A}}\right) \end{Bmatrix}$$

The solution to the above equations that provides the minimum $\Delta V_1$ and $\Delta V_2$ is the most advantageous choices since smaller velocity changes generally consume less fuel than larger velocity changes, and since smaller velocity changes have less potential to create unwanted disturbances in the satellite's orbit as compared to larger velocity changes. However, the solution becomes invalid if either $\Delta V_1$ or $\Delta V_2$ is less than zero, which occurs when the magnitude of $\Delta V_{drift}$ approaches the magnitude of $[\Delta V_{K1}\ \Delta V_{H1}]$. In these situations the formulation for one maneuver can be used, and one set of $\Delta V$ and $\lambda$ control both the drift and eccentricity:

$$\Delta V_1 = \frac{\Delta V_{drift}}{t_1}$$

$$\lambda_1 = \tan^{-1}\left(\frac{\Delta V_1 2 t_1 \Delta V_{H_1} + \Delta V_1 r_1 \Delta V_{K_1}}{\Delta V_1 2 t_1 \Delta V_{K_1} - \Delta V_1 r_1 \Delta V_{H_1}}\right)$$

According to the equations above, the size of the burn is dictated by the drift correction while the location of the burn is determined by the direction of the eccentricity correction $[\Delta V_{K1}\ \Delta V_{H1}]$ and the in-plane components of the thrust vector $[t_1\ r_1]$. Since $\Delta V_{drift}$ does not necessarily have the same magnitude as $[\Delta V_{K1} \Delta V_{H1}]$, the one maneuver solution may result in either under correction (undershoot) or over correction (overshoot) of the eccentricity perturbation. In such cases, the difference can be corrected in the next control cycle. For a given inclination correction $[\Delta V_{K2} \Delta V_{H2}]$, the solutions for $\Delta V$ and $\lambda$ are very simple:

$$\Delta V_I = \sqrt{\Delta V_{H_2}^2 + \Delta V_{K_2}^2}$$

$$\Delta V_3 = \frac{\Delta V_I}{n_3}$$

$$\lambda_3 = a\tan2\left(\frac{\Delta V_{H_2}}{\Delta V_I}, \frac{\Delta V_{K_2}}{\Delta V_I}\right)$$

According to the present embodiments, it is possible to perform simultaneous momentum dumping and orbit control.

Benefits achieved by the present embodiments include a reduction in the number of maneuvers needed to maintain station, increased efficiency in propellant usage, reduction in transients, tighter orbit control, which has the added benefit of reducing the antenna pointing budget, a reduction in the number of station-keeping thrusters needed aboard the satellite, elimination of any need for the thrusters to point through the center of mass of the satellite, thus reducing the need for dedicated station-keeping thrusters, and the potential to enable completely autonomous orbit and angular momentum control.

In the present embodiments, since the equations for orbit control are in the orbit frame, the momentum dumping requirement is computed in the same frame:

$\Delta \vec{H}$=momentum dumping requirement (vector) in orbit frame $\Delta \vec{H}_{ECI}$=momentum dumping requirement (vector) in Earth—Centered Inertial frame $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $C_{Orbit\ to\ ECI}$=transformation matrix from orbit to ECI frame $C_{Body\ to\ Orbit}$=transformation matrix from spacecraft body to orbit frame $$\vec{r}_i = C_{Body\ to\ Orbit}\vec{R}_i$$

$$\vec{f}_i = C_{Body\ to\ Orbit}\vec{F}_i$$

$$\Delta \vec{H} = \sum_i \vec{r}_i \otimes \vec{f}_i \Delta t_i$$

$$\Delta \vec{H}_{ECI} = C_{Orbit\ to\ ECI}\Delta \vec{H}$$

Using the equation for impulse, $\vec{P}$(impulse)=
$\vec{f}$(thrust)$\Delta t$(ontime)=$M$(spacecraft_mass)$\Delta \vec{V}$(delta_velocity), the equations for momentum and orbit control can be reformulated into more convenient forms by multiplying the orbit control equations by the spacecraft mass, which changes very little for small burns:

$$M\sum_i \Delta V_i t_i = M\Delta V_{drift} \quad \rightarrow \quad \sum_i f_i^{tangential}\Delta t_i = \Delta P_{drift}$$

$$M\sum_i \Delta V_i(2t_i\cos\lambda_i + r_i\sin\lambda_i) = M\Delta V_{K_1} \quad \rightarrow \quad \sum_i (2f_i^{tangential}\cos\lambda_i + f_i^{radial}\sin\lambda_i)\Delta t_i = \Delta P_{K_1}$$

$$M\sum_i \Delta V_i(2t_i\sin\lambda_i - r_i\cos\lambda_i) = M\Delta V_{H_1} \quad \rightarrow \quad \sum_i (2f_i^{tangential}\sin\lambda_i - f_i^{radial}\cos\lambda_i)\Delta t_i = \Delta P_{H_1}$$

$$M\sum_i \Delta V_i n_i\cos\lambda_i = M\Delta V_{K_2} \quad \rightarrow \quad \sum_i (f_i^{normal}\cos\lambda_i)\Delta t_i = \Delta P_{K_2}$$

$$M\sum_i \Delta V_i n_i\sin\lambda_i = M\Delta V_{H_2} \quad \rightarrow \quad \sum_i (f_i^{normal}\sin\lambda_i)\Delta t_i = \Delta P_{H_2}$$

$$\Delta \vec{H} = \sum_i \vec{r}_i \otimes \vec{f}_i \Delta t_i \quad \rightarrow \quad \Delta \vec{H} = \sum_i \vec{r}_i \otimes \vec{P}_i$$

There are eight equations above, five for the orbit control and three for the momentum dump. Accordingly, the equations require eight unknowns for their solutions. However, since the orientation of $\Delta H$ (the momentum vector in the orbit frame) varies with orbital position of the spacecraft, closed form solutions to the eight equations above can be found by coupling the momentum dumping with orbit control in specific directions. For example, coupling the momentum dumping with drift control yields the following simple algebraic equations:

$$\sum_i f_i^{tangential}\Delta t_i = \Delta P_{drift}$$

$$\Delta \vec{H} = \sum_i \vec{r}_i \otimes \vec{P}_i$$

And coupling the momentum dumping with inclination control yields the following equations:

$$\sqrt{\Delta P_{H_2}^2 + \Delta P_{K_2}^2} = \Delta P_I$$

$$\sum_i f_i^{normal}\Delta t_i = \Delta P_I$$

$$\Delta \vec{H} = \sum_i \vec{r}_i \otimes \vec{P}_i$$

Either set of equations above requires just four unknowns for their general solutions. For a satellite with fixed thrusters, the unknown can be chosen as the on time of the thrusters. Therefore, the momentum dumping and the selected orbit control can advantageously be accomplished by firing thrusters without the need to mount the thrusters on gimbaled platforms. The momentum dump can be performed in conjunction with drift control, or in conjunction with inclination control, or a combination of both.

By solving for the location of the maneuver, the complete solution for the momentum dump and inclination control can easily be obtained from the following equations:

$$\sqrt{\Delta P_{K_2}^2 + \Delta P_{H_2}^2} = \Delta P_l$$

$$\lambda_{Inclination} = \operatorname{atan2}\left(\frac{\Delta P_{H_2}}{\Delta P_l}, \frac{\Delta P_{K_2}}{\Delta P_l}\right)$$

$$\Delta \vec{H} = C_{Orbit\ to\ ECI}^{-1} \Delta \vec{H}_{ECI}$$

$$\sum_i \vec{r}_i \otimes \vec{f}_i \Delta t_i = \Delta \vec{H}$$

$$\sum_i f_i^{normal} \Delta t_i = \Delta P_l$$

where $\Delta \vec{H}$=momentum dumping requirement (vector) in orbit frame $\Delta \vec{H}_{ECI}$=momentum dumping requirement (vector) in Earth—Centered Inertial frame $\Delta P_{K_2}$=spacecraft mass X minimum delta velocity required to control mean $K_2$ $\Delta P_{H_2}$=spacecraft mass X minimum delta velocity required to control mean $H_2$ $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Inclination}$=location of the maneuver $C_{Orbit\ to\ ECI}$=transformation matrix from orbit to ECI frame, rotation matrix about the Z by $\lambda_{Inclination}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i$$

$$= \begin{bmatrix} f_i^{tangential} \\ f_i^{radial} \\ f_i^{normal} \end{bmatrix}$$

$$= \begin{bmatrix} f_i^1 \\ f_i^2 \\ f_i^3 \end{bmatrix} = \text{thrust vector for the } i^{th} \text{ thruster}$$

Since the maneuver to control the drift is independent of location, the complete solution for the momentum dumping and drift control can be obtained from the following algebraic equations:

$$\sum_i f_i^{tangential} \Delta t_i = \Delta P_{Drift}$$

$$\sum_i \vec{r}_i \otimes \vec{f}_i \Delta t_i = \Delta \vec{H}$$

where $\Delta \vec{H}$=momentum dumping requirement (vector) in orbit frame $\Delta P_{Drift}$=spacecraft mass X minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $C_{Orbit\ to\ ECI}$=transformation matrix from orbit to ECI frame $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i$$

$$= \begin{bmatrix} f_i^{tangential} \\ f_i^{radial} \\ f_i^{normal} \end{bmatrix}$$

$$= \begin{bmatrix} f_i^1 \\ f_i^2 \\ f_i^3 \end{bmatrix} = \text{thrust vector for the } i^{th} \text{ thruster}$$

By placing the drift maneuvers in the locations determined by the drift and eccentricity control equations, the momentum dumping can be performed in conjunction with the eccentricity control. For one maneuver drift and eccentricity control, $\lambda_{Eccentricity}$ can be found by simple iteration (or root searching method) of the following equations:

$$P^{radial} = \sum_i f_i^{radial} \Delta t_i$$

$$\lambda_{Eccentricity} = \tan^{-1}\left(\frac{2\Delta P_{Drift}\Delta P_{H_1} + P^{radial}\Delta P_{K_1}}{2\Delta P_{Drift}\Delta P_{K_1} - P^{radial}\Delta P_{H_1}}\right)$$

$$\Delta \vec{H} = C_{Orbit\ to\ ECI}^{-1} \Delta \vec{H}_{ECI}$$

$$\sum_i \vec{r}_i \otimes \vec{f}_i \Delta t_i = \Delta \vec{H}$$

$$\sum_i f_i^{tangential} \Delta t_i = \Delta P_{Drift}$$

where $\Delta \vec{H}$=momentum dumping requirement (vector) in orbit frame $\Delta \vec{H}_{ECI}$=momentum dumping requirement (vector) in Earth—Centered Inertial frame $\Delta P_{K_1}$=spacecraft mass X minimum delta velocity required to control mean $K_1$ $\Delta P_{H_1}$=spacecraft mass X minimum delta velocity required to control mean $H_1$ $\Delta P_{Drift}$=spacecraft mass X minimum delta velocity required to control mean Drift $\vec{R}_i$=lever arm (vector) about the cg. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Eccentricity}$=location of the maneuver $C_{Orbit\ to\ ECI}$=transformation matrix from orbit to ECI frame rotation matrix about the Z by $\lambda_{Inclination}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i$$

$$= \begin{bmatrix} f_i^{tangential} \\ f_i^{radial} \\ f_i^{normal} \end{bmatrix}$$

$$= \begin{bmatrix} f_i^1 \\ f_i^2 \\ f_i^3 \end{bmatrix} = \text{thrust vector for the } i^{th} \text{ thruster}$$

The solution for the two-maneuvers eccentricity control can be used in conjunction with the equation for momentum and drift control to obtain the complete solution for momentum dumping and two maneuvers drift/eccentricity control:

$$\sum_{j=1,2} \vec{f}_j^{radial} \Delta \bar{t}_j = \sum_{j=1,2} P_j^{radial}$$

$$\sum_{j=1,2} \vec{f}_j^{tangential} \Delta \bar{t}_j = \sum_{j=1,2} P_j^{tangential} = \Delta P_{drift}$$

$$(2P_1^{tangential}\cos\lambda_1 + P_1^{radial}\sin\lambda_1) + $$
$$(2P_2^{tangential}\cos(\lambda_1 - \Delta\lambda) + P_2^{radial}\sin(\lambda_1 - \Delta\lambda)) = \Delta P_{K_1}$$

$$(2P_1^{tangential}\sin\lambda_1 - P_1^{radial}\cos\lambda_1) + $$
$$(2P_2^{tangential}\sin(\lambda_1 - \Delta\lambda) - P_2^{radial}\cos(\lambda_1 - \Delta\lambda)) = \Delta P_{H_1}$$

$$-2P_1^{radial}P_2^{radial}\sin\Delta\lambda - 4P_1^{tangential}P_2^{radial}\cos\Delta\lambda - $$
$$8P_1^{tangential}P_2^{tangential}\sin\Delta\lambda + 4P_1^{radial}P_2^{tangential}\cos\Delta\lambda = 0$$

$$\lambda_2 = \lambda_1 - \Delta\lambda$$

$$\Delta\vec{H}_{ECI} = \sum_j \Delta\vec{H}_{ECI,j}$$

$$\Delta\vec{H}_j = C_{Orbit\ to\ ECI}^{-1}(\lambda_j)\Delta\vec{H}_{ECI,j}$$

$$\sum_i f_{i,j}^{tangential} \Delta t_{i,j} = P_j^{tangential}$$

$$\sum_i \vec{r}_{i,j} \otimes \vec{f}_{i,j} \Delta t_{i,j} = \Delta\vec{H}_j$$

$$\vec{r}_{i,j} = C_{Body\ to\ Orbit} \vec{R}_{i,j}$$

$$\vec{f}_{i,j} = C_{Body\ to\ Orbit} \vec{F}_{i,j} = \begin{bmatrix} f_{i,j}^{tangential} \\ f_{i,j}^{radial} \\ f_{i,j}^{normal} \end{bmatrix}$$

j=1, 2 index for the maneuvers
i=index for the $i^{th}$ thruster

The four sets of equations above (momentum dumping and inclination control; momentum dumping and drift control; one maneuver drift and eccentricity control; and two maneuvers drift and eccentricity control) can be performed independently, or in various combinations with one another. Example combinations include momentum dumping and inclination control with one maneuver drift and eccentricity control, and momentum dumping and inclination control with two maneuvers drift and eccentricity control. Under certain circumstances, momentum dumping and drift control may be performed independently in order to maintain the satellite's longitude. For orbits that typically do not require control of inclination, such as, for example, satellites designed for geomobile communications, either one maneuver drift and eccentricity control or two maneuvers drift and eccentricity control may be used to control the orbit drift and eccentricity. Note that the one-maneuver/two-maneuver suggestion applies throughout the document.

Using the equations described above for simultaneous momentum dumping and orbit control, substantial benefits can be achieved. For example, the number of maneuvers needed to maintain station can be reduced. Also, station-keeping maneuvers can be performed with a single burn. Each of these benefits contributes to increased efficiency in propellant usage, which in turn extends the satellite's lifespan. If desired, single station-keeping maneuvers can be broken into segments, or pulses, which can be spaced out over multiple burns. In such embodiments, the pulses can be separated by lesser time intervals as compared to prior art methods. For example, the elapsed time between pulses may be on the order of minutes, rather than hours, and may even be less than one minute.

The present system and methods also enable tighter orbit control, which has the added benefit of improving antenna link margins. Because station-keeping maneuvers can be performed with single burns, or with closely spaced pulsed burns, transients are reduced. The satellite is thus more likely to be on station, even between pulses. Station-keeping maneuvers can also be performed with a reduced number of station-keeping thrusters aboard the satellite. For example, some maneuvers can be performed with as little as three or four thrusters.

The present methods also eliminate the need for the thrusters to point through the center of mass of the satellite, which in turn reduces the need for dedicated station-keeping thrusters. In certain embodiments, however, some thrusters may point through the center of mass. The present methods can also be performed with thrusters that are not pivotable with respect to the satellite, which reduces the complexity and cost of the satellite. In certain embodiments, however, some or all thrusters may be pivotable with respect to the satellite. For example, the thrusters may be mounted on gimbaled platforms.

The present system and methods of simultaneous momentum dumping and orbit control also facilitate completely autonomous orbit and angular momentum control. Satellites are typically controlled from Earth, with station-keeping commands transmitted from Earth to the satellite. The present methods, however, facilitate elimination of the Earth-bound control center. The satellite itself may monitor its position and trajectory, generate station-keeping commands on board, and execute the commands, all without the need for any intervention from Earth.

While the system and methods above have been described as having utility with geosynchronous satellites, those of ordinary skill in the art will appreciate that the present system and methods may also be used for orbit control and momentum dumping in satellites in non-geosynchronous circular and near circular orbits. For example, the present system and methods may also be used for satellites in non-geosynchronous low Earth orbit (altitude from approximately 100 km to approximately 2,000 km) and or medium Earth orbit (altitude from approximately 3,000 km to approximately 25,000+ km).

While the sets of equations described above are useful for general configurations and for finding optimal designs for specific systems, a faster and more stable solution can be found if the system is configured to allow the following combinations of orbit control and momentum dumping: inclination control with roll/yaw momentum dump, and drift and eccentricity control with pitch momentum dump. In certain embodiments of the present system and methods, one or the other of the foregoing combinations of orbit control and momentum dumping may be used for station-keeping. In other embodiments, both of the foregoing combinations may be used.

In one embodiment, inclination control is performed simultaneously with roll yaw momentum dumping where the spacecraft is configured with a plurality of north/south thrusters having negligible thrust components in the x-z plane. In this system, the pitch component of the change in momentum ($\Delta H$) can be ignored, and the number of control equations are reduced to three:

$$\sum_{i=1,3} f_i^{normal} \Delta t_i = \Delta P_I$$

$$\sum_{i=1,3} (r_i^2 f_i^3 - r_i^3 f_i^2) \Delta t_i = \Delta H_{roll}$$

$$\sum_{i=1,3} (r_i^3 f_i^1 - r_i^1 f_i^3) \Delta t_i = \Delta H_{yaw}$$

where
$\Delta P_I$=spacecraft mass X minimum delta velocity required to control mean inclination
$\Delta H_{roll}$=roll momentum dumping requirement in orbit frame
$\Delta H_{yaw}$=yaw momentum dumping requirement in orbit frame
$f_1^{tangential}=f_i^1$=tangential component for the $i^{th}$ thruster
$f_i^{radial}=f_i^2$=radial component for the $i^{th}$ thruster
$f_i^{normal}=f_i^3$=normal component for the $i^{th}$ thruster
$r_i^1$=x component of the lever arm for the $i^{th}$ thruster
$r_i^2$=y component of the lever arm for the $i^{th}$ thruster
$r_i^3$=z component of the lever arm for the $i^{th}$ thruster
$\Delta t_i$=on time for the $i^{th}$ thruster The above set of three equations requires only the firing of three north/south thrusters for general inclination control and roll/yaw momentum dumping. For typical systems with four north/south thrusters, a set of three thrusters can be selected to minimize the total thruster on time to save fuel.

In another embodiment, drift and eccentricity control are performed simultaneously with pitch momentum dumping where the spacecraft is configured with a plurality of east/west thrusters having negligible thrust components out of the x-z plane and allowing production of only pitch torque. In this system, the number of equations are reduced to two:

$$\sum_{i=1,2} f_i^{tangential} \Delta t_i = \Delta P_{Drift}$$

$$\sum_{i=1,2} (r_i^1 f_i^2 - r_i^2 f_i^1) \Delta t_i = \Delta H_{pitch}$$

where
$\Delta P_{Drift}$=spacecraft mass X minimum delta velocity required to control mean longitudinal drift
$\Delta H_{pitch}$=pitch momentum dumping requirement in orbit frame
$f_i^{tangential}=f_i^1$=tangential component for the $i^{th}$ thruster
$f_i^{radial}=f_i^2$=radial component for the $i^{th}$ thruster
$f_i^{normal}=f_i^3$=normal component for the $i^{th}$ thruster
$r_i^1$=x component of the lever arm for the $i^{th}$ thruster
$r_i^2$=y component of the lever arm for the $i^{th}$ thruster
$\Delta t_i$=on time for the $i^{th}$ thruster The above set of two equations requires only the firing of two east/west thrusters for general drift/eccentricity control and pitch momentum dumping. For typical systems with four east/west thrusters, a pair of thrusters can be selected to minimize the total thruster on time to save fuel. Since the pitch torque is (almost) independent of the transformation between the Earth-centered inertial frame (ECI) and the orbit frame, the solutions for the drift and eccentricity control can be used directly without the need for iterations and the computation process can be simplified.

Figure 2:
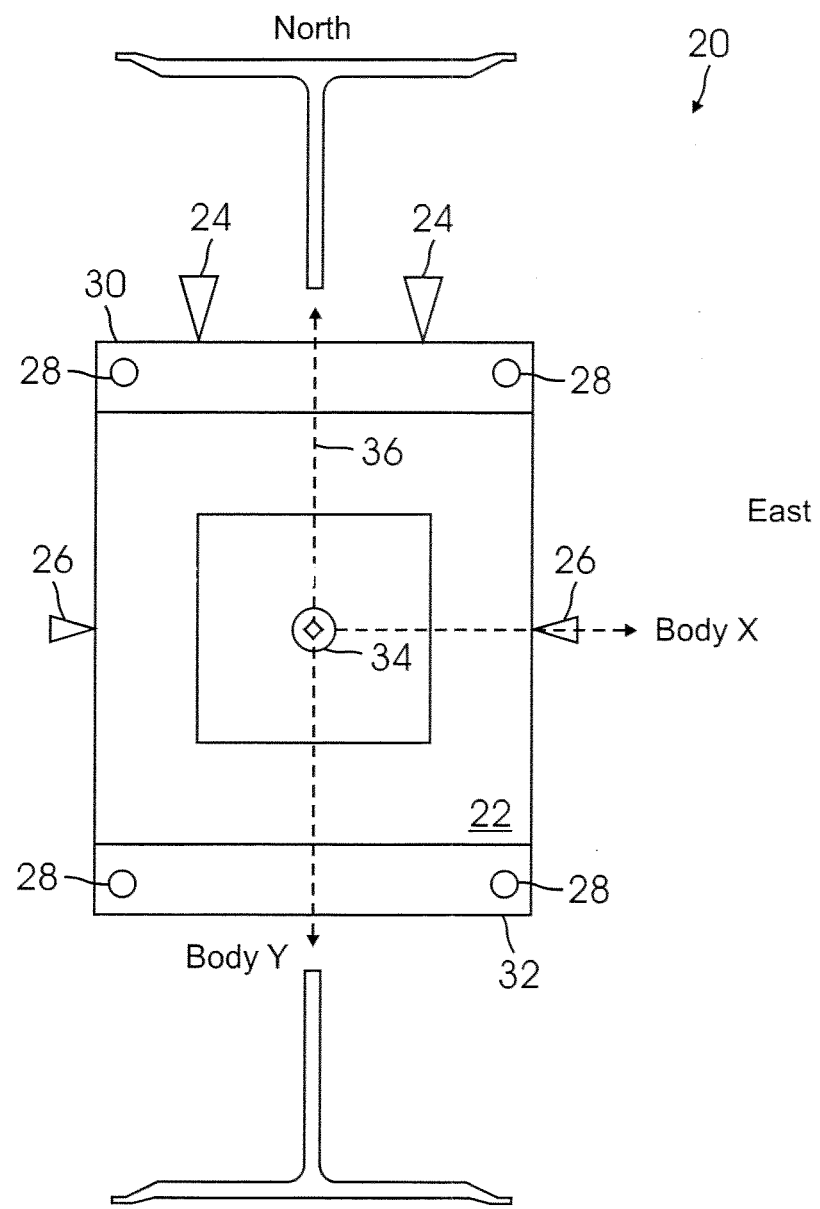
FIG. 2 is a rear elevation view of a geostationary satellite orbiting the Earth, illustrating one embodiment of the present system and methods for simultaneous momentum dumping and orbit control.
Figure 3:
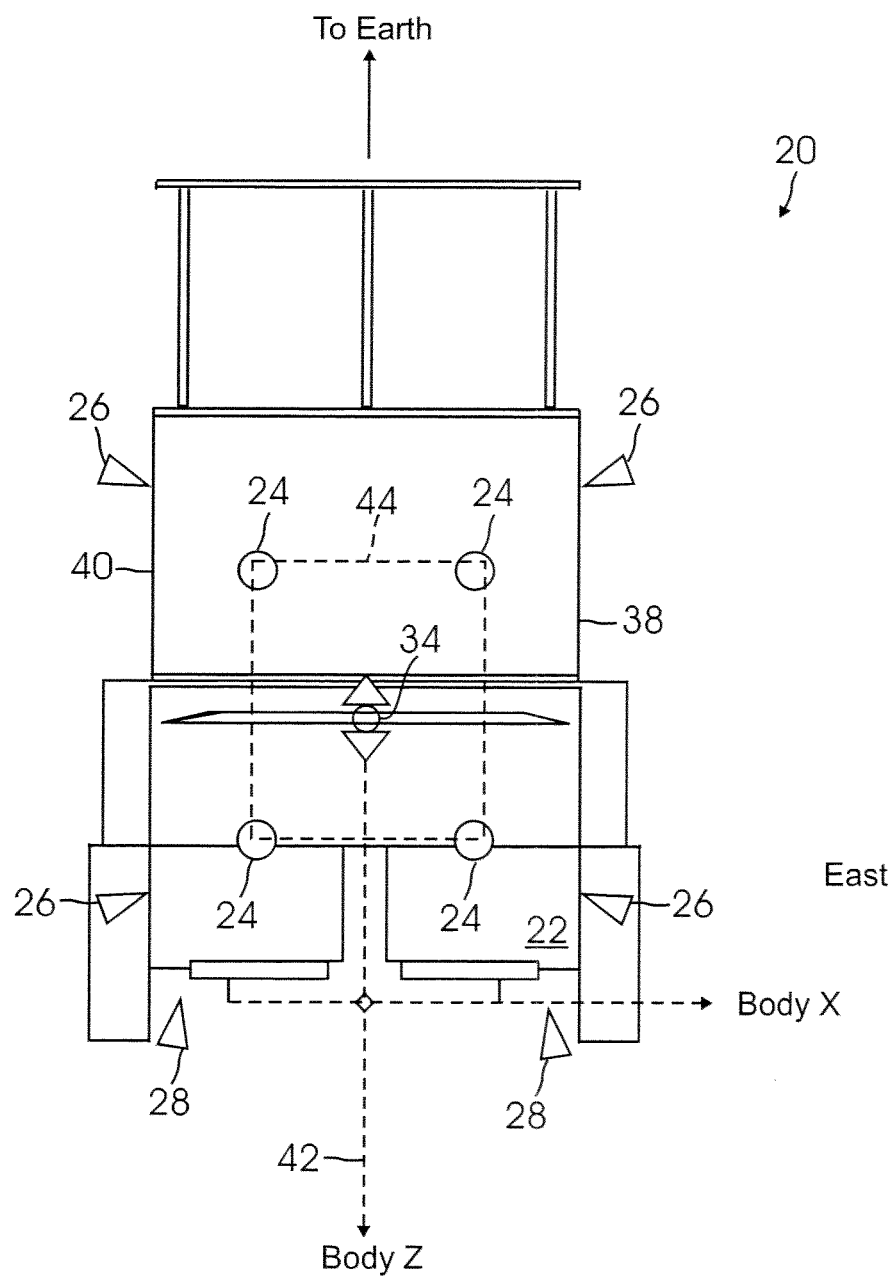
FIG. 3 is a top plan view of the geostationary satellite of FIG. 2.
Figure 4:
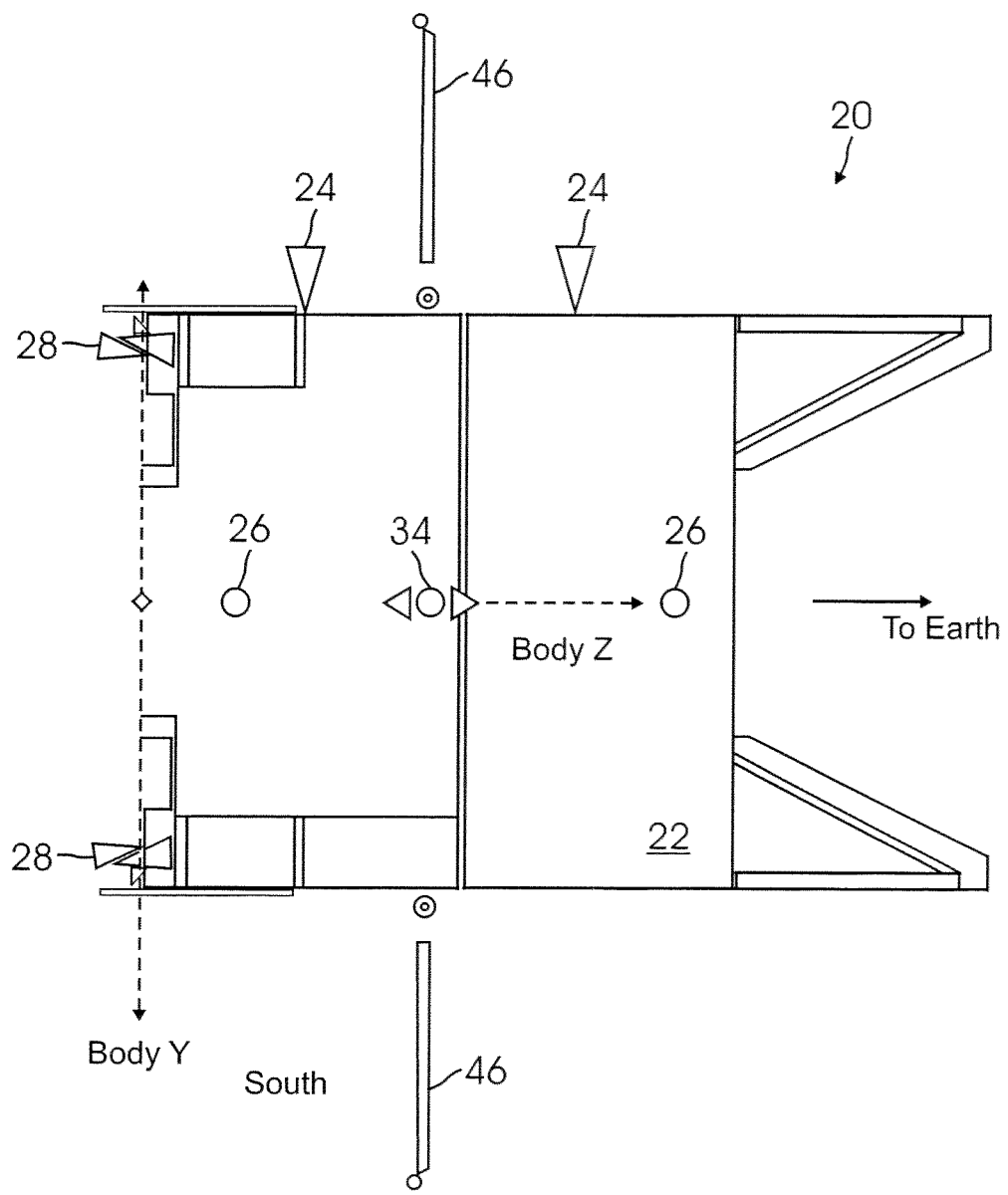
FIG. 4 is a left side elevation view of the geostationary satellite of FIG. 2.

FIGS. 2-4 schematically illustrate a spacecraft 20 configured according to one embodiment of the present system and methods for simultaneous momentum dumping and orbit control. FIG. 2 is a rear view, in which the spacecraft 20 is positioned between the viewer and Earth. The relative locations of the spacecraft 20 and Earth are as indicated in FIGS. 3 and 4.

The spacecraft 20 includes a spacecraft body 22, a plurality of north/south thrusters 24 and a plurality of east/west thrusters 26. In one embodiment, the spacecraft 20 includes a minimum of four north/south thrusters 24 and a minimum of two east/west thrusters 26. However, those of ordinary skill in the art will appreciate that any number of thrusters may be used. The illustrated spacecraft 20 further includes a plurality of axial thrusters 28, which are not relevant to the present application, but which may provide auxiliary support to the other thrusters.

In the illustrated embodiment, all four north/south thrusters 24 are located on the north face 30 (FIG. 2) of the spacecraft body 22. In alternative embodiments, the north/south thrusters 24 may all be located on the south face 32 (FIG. 2) of the spacecraft body 22, or they may be split between the north and south faces of the spacecraft body 22. For example, two north/south thrusters 24 may be located on the north face 30 and two on the south face 32.

With reference to FIG. 3, the north/south thrusters 24 are arranged about the spacecraft 20's center of mass (CM) 34. Further, with reference to FIG. 2, each north/south thruster 24 is oriented such that its direction of thrust is parallel to the spacecraft body's y-axis 36. This orientation produces a negligible thrust component in the x-z plane. This direction of thrust for the north/south thrusters 24 makes them suited for use in simultaneous inclination control (north/south station-keeping) and roll/yaw momentum dumping.

With reference to FIG. 3, in the illustrated embodiment, two east/west thrusters 26 are located on the east face 38 of the spacecraft body 22 and two east/west thrusters 26 are located on the west face 40. With continued reference to FIG. 3, the east/west thrusters 26 are arranged about the spacecraft's CM 34. Further, each east/west thruster 26 is oriented such that its direction of thrust is perpendicular to the spacecraft body's y-axis 36 (FIG. 2). This orientation produces a negligible thrust component out of the x-z plane. This direction of thrust for the east/west thrusters 26 makes them suited for use in simultaneous drift and eccentricity control (east/west station-keeping) and pitch momentum dumping.

With reference to FIG. 2, the spacecraft's CM 34 is roughly in the same plane defined by the net thrust of the east/west thrusters 26. Further, with reference to FIG. 3, the position of the spacecraft's CM 34 travels approximately parallel to the spacecraft body's z-axis 42 over the spacecraft's lifetime and is within the boundary 44 defined by the north/south thrusters 24. Similarly, the CM 34 also lies within the boundary defined by the axial thrusters 28. These features allow the thrusters to apply the appropriate amount of torque about the CM 34 to dump the momentum. Furthermore, angular control authority decreases as the CM gets close to the boundary, and thus increases fuel usage. If the CM were to cross the boundary, there would not be control authority every day of the year at the optimal dump location.

In certain of the present embodiments, the north/south thrusters 24 and the east/west thrusters 26 are located and sized so that the change in velocity (ΔV) resulting from roll/yaw momentum dumping exceeds the requirements for inclination control only occasionally. Under these circumstances, north/south thrusters 24 need only be provided on one of the north and south faces 30, 32 of the spacecraft 20.

The thruster layout and the motion of the spacecraft CM in the present embodiments ensure that unintended effects on components of spacecraft control are small and can be corrected by subsequent station-keeping maneuvers. Unintended effects include east/west motion and pitch momentum from the firing of the north/south thrusters 24, and north/south motion and roll/yaw momentum from the firing of the east/west thrusters 26. These effects can be treated as transient and are within the tolerance of the system. In certain other embodiments, disturbances meet interface requirements to permit operate-through maneuvers. In other words, the present embodiments enable full control of both orbit and momentum.

As illustrated above, the present embodiments achieve significant advantages over prior art systems and methods for station-keeping. For example by configuring the thrust vectors to minimize the cross coupling between the in-plane (x-z plane) and out-of-plane components, a simple and robust method for simultaneous momentum dumping and orbit control is achieved by dividing the objective into two parts. The first part combines north/south (inclination) control with roll/yaw momentum dumping, and the second part combines east/west (drift and eccentricity) control with pitch momentum dumping.

The present embodiments also reduce the number of sets of thrusters needed for station-keeping. Some conventional systems use separate thruster firings for orbit control and momentum dumping. They require three sets of thrusters: one set for momentum dumping, one set for north/south orbit control, and one set for east/west orbit control. The present embodiments achieve both orbit control and momentum dumping simultaneously and only require two sets of thrusters. And none of the thrusters needs to be mounted on a gimbaled platform.

For many orbital spacecraft, the dominant momentum perturbation is the overturning torque from the solar panel due to solar radiation pressure. The solar panels 46 (FIG. 4) are typically located on the north and south sides of the spacecraft 20 and rotate about the y- (pitch) axis of the body to track the Sun. In the present embodiments, by orienting the north/south thrusters 24 so that they create negligible thrust components in the x-z plane, the effect of the thruster firing to dump the roll/yaw component of the momentum can be used effectively for north/south orbit control with minimal disturbance to the east/west orbit motion. Further, since the orbital location of the firing is pre-determined by the orbit control requirement, the calculation of the burn plan is greatly simplified and the solution can handle more variation in system performance.

Similarly, by orienting the east/west thrusters 26 to point perpendicularly to the y-axis 36 (north/south direction) of the spacecraft 20, the pitch component of the momentum dumping requirement can be accomplished during the thruster firing for the east/west orbit control. Since the pitch component remains mostly constant with variations in orbit location, the calculation of the burn plan is also greatly simplified.

The present embodiments enable the spacecraft 20 to perform autonomous orbit control and momentum dumping. At the same time, the present embodiments reduce propellant consumption, reduce the amount of thruster firings, reduce disturbance torque due to thruster firings, and handle large variations of spacecraft mass properties throughout its operational life.

Under certain conditions, for example when the satellite is station-kept at longitude with high longitudinal acceleration and relatively small solar radiation force, one pair of thrusters may be sufficient for the simultaneous drift/eccentricity control and pitch momentum dump. Also, the thrusters used for the simultaneous drift/eccentricity control and pitch momentum dump do not have to be mounted on the east or west side of the spacecraft. These thrusters simply have to produce the necessary east/west thrust component for the orbit control.

The above description presents the best mode contemplated for carrying out the present system and methods for simultaneous momentum dumping and orbit control, and of the manner and process of making and using them, in such full, clear, concise, and exact terms as to enable any person skilled in the art to which they pertain to make this system and use these methods. This system and these methods are, however susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method of simultaneous orbit control and momentum dumping in a spacecraft in an orbit, the spacecraft including a plurality of north/south thrusters, the method comprising the steps of:
generating a set of firing commands for the north/south thrusters from solutions to inclination control and roll/yaw momentum dumping equations; and
firing the north/south thrusters according to the firing commands so that control of an inclination of the orbit and a roll/yaw momentum dumping are achieved simultaneously using only the north/south thrusters.

2. The method of claim 1, wherein the inclination control and roll/yaw momentum dumping equations comprise exactly three equations.

3. The method of claim 2, wherein the inclination control and roll/yaw momentum dumping equations are defined as $$\sum_{i=1,3} f_i^{normal} \Delta t_i = \Delta P_I$$

$$\sum_{i=1,3} (r_i^2 f_i^3 - r_i^3 f_i^2) \Delta t_i = \Delta H_{roll}$$

-continued $$\sum_{i=1,3} (r_i^3 f_i^1 - r_i^1 f_i^3)\Delta t_i = \Delta H_{yaw}$$

where
- $\Delta P_I$=spacecraft mass X minimum delta velocity required to control mean inclination
- $\Delta H_{roll}$=roll momentum dumping requirement in orbit frame
- $\Delta H_{yaw}$=yaw momentum dumping requirement in orbit frame
- $f_i^{tangential}$=$f_i^1$=tangential component for the $i^{th}$ thruster
- $f_i^{radial}$=$f_i^2$=radial component for the $i^{th}$ thruster
- $f_i^{normal}$=$f_i^3$=normal component for the $i^{th}$ thruster
- $r_i^1$=x component of the lever arm for the $i^{th}$ thruster
- $r_i^2$=y component of the lever arm for the $i^{th}$ thruster
- $r_i^3$=Z component of the lever arm for the $i^{th}$ thruster
- $\Delta t_i$=on time for the $i^{th}$ thruster.

4. The method of claim 1, wherein the spacecraft includes a plurality of east/west thrusters, the firing commands for the north/south thrusters are a first set of firing commands, and further comprising the steps of:
  generating a second set of firing commands for the east/west thrusters from solutions to drift and eccentricity control and pitch momentum dumping equations; and
  firing the east/west thrusters according to the second set of firing commands so that a drift and an eccentricity control of the orbit and a pitch momentum dumping are achieved simultaneously using only the east/west thrusters.

5. The method of claim 4, wherein the drift and eccentricity control and pitch momentum dumping equations are defined as $$\sum_{i=1,2} f_i^{tangential} \Delta t_i = \Delta P_{Drift}$$

$$\sum_{i=1,2} (r_i^1 f_i^2 - r_i^2 f_i^1)\Delta t_i = \Delta H_{pitch}$$

where
- $\Delta P_{Drift}$=spacecraft mass X minimum delta velocity required to control mean longitudinal drift
- $\Delta H_{pitch}$=pitch momentum dumping requirement in orbit frame
- $f_i^{tangential}$=$f_i^1$=tangential component for the $i^{th}$ thruster
- $f_i^{radial}$=$f_i^2$=radial component for the $i^{th}$ thruster
- $f_i^{normal}$=$f_i^3$=normal component for the $i^{th}$ thruster
- $r_i^1$=x component of the lever arm for the $i^{th}$ thruster
- $r_i^2$=y component of the lever arm for the $i^{th}$ thruster.

6. The method of claim 1, wherein the thrusters have fixed orientations relative to the spacecraft, such that the thrusters cannot pivot with respect to the spacecraft.

7. The method of claim 1, wherein when each thruster is fired it applies a force to the spacecraft, and none of said forces points through the center of mass of the spacecraft.

8. A method of simultaneous orbit control and momentum dumping in a spacecraft, the spacecraft including a plurality of east/west thrusters, the method comprising the steps of:
  generating a set of firing commands for the east/west thrusters from solutions to drift and eccentricity control and pitch momentum dumping equations; and
  firing the east/west thrusters according to the firing commands so that a drift and an eccentricity control of the orbit and a pitch momentum dumping are achieved simultaneously using only the east/west thrusters.

9. The method of claim 8, wherein the drift and eccentricity control and pitch momentum dumping equations comprise exactly two equations.

10. The method of claim 9, wherein the drift and eccentricity control and pitch momentum dumping equations are defined as $$\sum_{i=1,2} f_i^{tangential} \Delta t_i = \Delta P_{Drift}$$

$$\sum_{i=1,2} (r_i^1 f_i^2 - r_i^2 f_i^1)\Delta t_i = \Delta H_{pitch}$$

where
- $\Delta P_{Drift}$=spacecraft mass X minimum delta velocity required to control mean longitudinal drift
- $\Delta H_{pitch}$=pitch momentum dumping requirement in orbit frame
- $f_i^{tangential}$=$f_i^1$=tangential component for the $i^{th}$ thruster
- $f_i^{radial}$=$f_i^2$=radial component for the $i^{th}$ thruster
- $f_i^{normal}$=$f_i^3$=normal component for the $i^{th}$ thruster
- $r_i^1$=x component of the lever arm for the $i^{th}$ thruster
- $r_i^2$=y component of the lever arm for the $i^{th}$ thruster.

11. The method of claim 8, wherein the thrusters have fixed orientations relative to the spacecraft, such that the thrusters cannot pivot with respect to the spacecraft.

12. The method of claim 8, wherein when each thruster is fired it applies a force to the spacecraft, and none of said forces points through the center of mass of the spacecraft.

13. A system for simultaneous orbit control and momentum dumping of a spacecraft in an orbit, comprising:
  a plurality of north/south thrusters affixed to the spacecraft; and
  means for generating a set of firing commands for the north/south thrusters from solutions to inclination control and roll/yaw momentum dumping equations so that control of an inclination of the orbit and a roll/yaw momentum dumping are achieved simultaneously using only the north/south thrusters.

14. The system of claim 13, wherein the inclination control and roll/yaw momentum dumping equations comprise exactly three equations.

15. The system of claim 14, wherein the inclination control and roll/yaw momentum dumping equations are defined as $$\sum_{i=1,3} f_i^{normal} \Delta t_i = \Delta P_I$$

$$\sum_{i=1,3} (r_i^2 f_i^3 - r_i^3 f_i^2)\Delta t_i = \Delta H_{roll}$$

$$\sum_{i=1,3} (r_i^3 f_i^1 - r_i^1 f_i^3)\Delta t_i = \Delta H_{yaw}$$

where
- $\Delta P_I$=spacecraft mass X minimum delta velocity required to control mean inclination
- $\Delta H_{roll}$=roll momentum dumping requirement in orbit frame
- $\Delta H_{yaw}$=yaw momentum dumping requirement in orbit frame
- $f_i^{tangential}$=$f_i^1$=tangential component for the $i^{th}$ thruster
- $f_i^{radial}$=$f_i^2$=radial component for the $i^{th}$ thruster $f_i^{normal}=f_i^3=$normal component for the i$^{th}$ thruster
$r_i^1=$x component of the lever arm for the i$^{th}$ thruster
$r_i^2=$y component of the lever arm for the i$^{th}$ thruster
$r_i^3=$Z component of the lever arm for the i$^{th}$ thruster
$\Delta t_i=$on time for the i$^{th}$ thruster.

16. The system of claim 13, wherein the spacecraft includes a plurality of east/west thrusters, and further comprising means for generating a set of firing commands for the east/west thrusters from solutions to drift and eccentricity control and pitch momentum dumping equations so that a drift and an eccentricity control of the orbit and a pitch momentum dumping are achieved simultaneously using only the east/west thrusters.

17. The system of claim 16, wherein the drift and eccentricity control and pitch momentum dumping equations are defined as $$\sum_{i=1,2} f_i^{tangential} \Delta t_i = \Delta P_{Drift}$$

$$\sum_{i=1,2} (r_i^1 f_i^2 - r_i^2 f_i^1) \Delta t_i = \Delta H_{pitch}$$

where
$\Delta P_{Drift}=$spacecraft mass X minimum delta velocity required to control mean longitudinal drift
$\Delta H_{pitch}=$pitch momentum dumping requirement in orbit frame
$f_i^{tangential}=f_i^1=$tangential component for the i$^{th}$ thruster
$f_i^{radial}=f_i^2=$radial component for the i$^{th}$ thruster
$f_i^{normal}=f_i^3=$normal component for the i$^{th}$ thruster
$r_i^1=$x component of the lever arm for the i$^{th}$ thruster
$r_i^2=$y component of the lever arm for the i$^{th}$ thruster.

18. A spacecraft configured to orbit Earth in a geostationary orbit, and further configured to autonomously control a position of the spacecraft relative to a fixed point on Earth, comprising:
a spacecraft body; and
a plurality of north/south thrusters associated with the spacecraft body, the north/south thrusters;
wherein the spacecraft generates a set of firing commands for the north/south thrusters from solutions to inclination control and roll/yaw momentum dumping equations, and the spacecraft fires the thrusters according to the firing commands so that control of an inclination of the orbit and a roll/yaw momentum dumping are achieved simultaneously using only the north/south thrusters.

19. The spacecraft of claim 18, wherein the inclination control and roll/yaw momentum dumping equations comprise exactly three equations.

20. The spacecraft of claim 19, wherein the inclination control and roll/yaw momentum dumping equations are defined as $$\sum_{i=1,3} f_i^{normal} \Delta t_i = \Delta P_I$$

$$\sum_{i=1,3} (r_i^2 f_i^3 - r_i^3 f_i^2) \Delta t_i = \Delta H_{roll}$$

$$\sum_{i=1,3} (r_i^3 f_i^1 - r_i^1 f_i^3) \Delta t_i = \Delta H_{yaw}$$

where
$\Delta P_I=$spacecraft mass X minimum delta velocity required to control mean inclination
$\Delta H_{roll}=$roll momentum dumping requirement in orbit frame
$\Delta H_{yaw}=$yaw momentum dumping requirement in orbit frame
$f_i^{tangential}=f_i^1=$tangential component for the i$^{th}$ thruster
$f_i^{radial}=f_i^2=$radial component for the i$^{th}$ thruster
$f_i^{normal}=f_i^3=$normal component for the i$^{th}$ thruster
$r_i^1=$x component of the lever arm for the i$^{th}$ thruster
$r_i^2=$y component of the lever arm for the i$^{th}$ thruster
$r_i^3=$Z component of the lever arm for the i$^{th}$ thruster
$\Delta t_i=$on time for the i$^{th}$ thruster.

21. The spacecraft of claim 18, wherein the spacecraft includes a plurality of east/west thrusters, and further comprising means for generating a set of firing commands for the east/west thrusters from solutions to drift and eccentricity control and pitch momentum dumping equations so that a drift and an eccentricity control of the orbit and a pitch momentum dumping are achieved simultaneously using only the east/west thrusters.

22. The spacecraft of claim 21, wherein the drift and eccentricity control and pitch momentum dumping equations are defined as $$\sum_{i=1,2} f_i^{tangential} \Delta t_i = \Delta P_{Drift}$$

$$\sum_{i=1,2} (r_i^1 f_i^2 - r_i^2 f_i^1) \Delta t_i = \Delta H_{pitch}$$

where
$\Delta P_{Drift}=$spacecraft mass X minimum delta velocity required to control mean longitudinal drift
$\Delta H_{pitch}=$pitch momentum dumping requirement in orbit frame
$f_i^{tangential}=f_i^1=$tangential component for the i$^{th}$ thruster
$f_i^{radial}=f_i^2=$radial component for the i$^{th}$ thruster
$f_i^{normal}=f_i^3=$normal component for the i$^{th}$ thruster
$r_i^1=$x component of the lever arm for the i$^{th}$ thruster
$r_i^2=$y component of the lever arm for the i$^{th}$ thruster.

* * * * *